Patented May 5, 1931

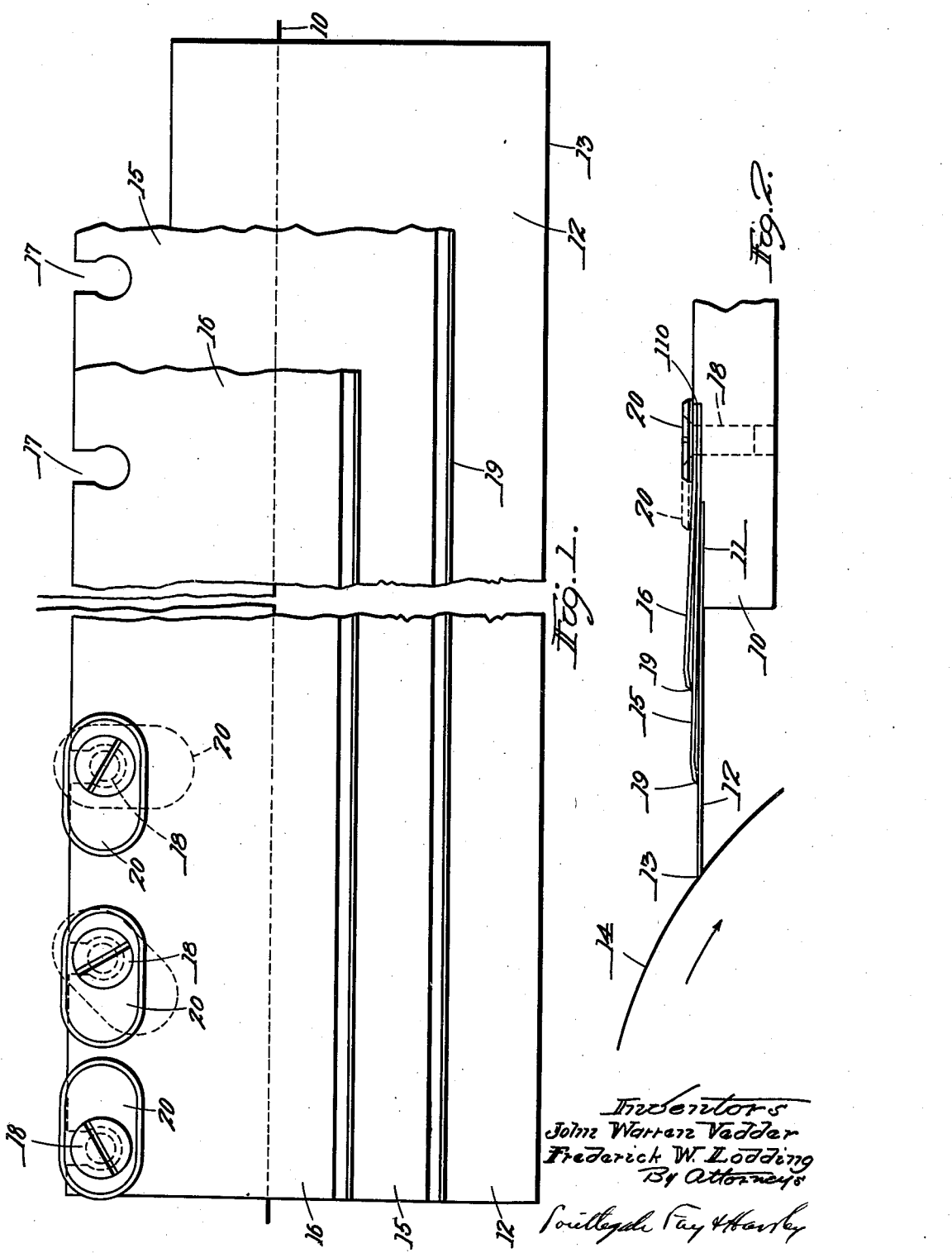

1,803,925

UNITED STATES PATENT OFFICE

JOHN WARREN VEDDER AND FREDERICK W. LODDING, OF WORCESTER, MASSACHUSETTS, ASSIGNORS TO RICE, BARTON & FALES, INCORPORATED, OF WORCESTER, MASSACHUSETTS, A CORPORATION OF MASSACHUSETTS

FLEXIBLE DOCTOR

Application filed January 28, 1929. Serial No. 335,600.

The object of this invention is to provide a new and improved doctor apparatus particularly adapted for use in connection with the calender rolls of a paper making machine. The invention has particular reference to improving the structure illustrated in patent to Frossard No. 1,034,780, patented August 6, 1912. The doctor apparatus illustrated in this patent comprises a slotted support extending lengthwise or parallel with the axis of the roll, and a flexible doctor or scraper blade fitted and held in said slot, which blade is held in contact with the periphery of the roll by a plurality of springs riveted to the support. As the rolls used in paper making machines are very long, sometimes 300 inches or more, it is a difficult matter to keep the edge of the blade accurately in exact contact with the roll throughout its length.

The principal object of this improvement is to accomplish this desirable end and also to provide means for adjustment for wear. To do this we provide means whereby the flexure of the blade can be changed at different places along its length. We preferably employ a composite or laminated blade. This blade is rigidly secured at its rear end to the support by a series of blocks or washers which are held by screws to the support, the space between the bocks and the supports forming in effect a slot. The blocks are made non-circular in shape so that any particular block can be turned more or less out on the blade so that when its screw is clamped down the blade will be flexed more or less at this particular point. The composite structure is made up of one or more spring blades of shorter width resting on top of the scraper blade, these additional spring blades being bent down at their edges towards the roll so as to permit a flexure, and these edges being sharpened or bevelled to fit accurately on the scraper blade and on each other so that fiber or dust cannot work into the blade. The improvement also consists of certain details hereinafter particularized at length.

The improvement is illustrated in the accompanying sheet of drawings in which

Fig. 1 is a partial plan view of a doctor constructed in accordance with the improvement, illustrating how the adjusting means can be set in different positions, and Fig. 2 is an end view thereof.

Referring to the drawings and in detail, 10 designates the support, which has a groove 11 formed or cut therein along its front edge for receiving the flexible doctor or scraper blade 12, the front edge of which is ground or bevelled to fit accurately on the periphery of the calender or roll 14.

Supplemental spring blades 15 and 16 are placed on top of the scraper blade 12 and the rear ends thereof fit in a supplemental groove or slot 110 formed in the support 10. The front edges of the supplemental spring blades 15 and 16 are bent downwardly and are sharpened or bevelled as at 19 for the purpose stated. A series of screws 18 is threaded into the support, and fitted under each screw head is a head or washer 20. These heads or washers are eccentrically arranged on the screws. As shown, the heads are made longer in one direction, with two parallel sides and rounded ends. The heads of the screws 18 are countersunk into the washers 20 and the edges of the washers are bevelled so as to provide a surface which can be easily cleaned or wiped. The blades 15 and 16 are provided with recesses 17 so that the blades 15 and 16 can be fitted on the screws.

The structure is assembled as follows: the washers 20 are placed on the screws 18 and the screws are partly threaded down into the support. The rear edge of the composite blade is then slid into the slot formed between the heads 20 and the support. The heads are first turned so that their long dimensions will be parallel with the axis of the roll 14, as illustrated in full lines in Fig. 1. Then the screws are clamped down tightly so that the blade will be rigidly held at its rear edge. Then the support is adjusted so that the forward end of the flexible blade 12 will bear on the periphery of the roll. Then a careful inspection is made of the blade along its length and if the same is found not bearing accurately on the roll at any point along its transverse length, the screw 18 opposite this point is loosened and the head or washer 20 is swung around so that the same will bear farther out on the blade. This swinging action can be any part of a 90 degree rotation, two positions of adjustment of a head being indicated in dotted lines. Then when the head is swung out in this manner the screw which has been loosened is clamped down. This will flex or press the spring blade 16 down more tightly at this particular point, which blade in turn will press down tighter and harder on the spring blade 15, which in turn will press down and flex the scraper blade 13 down towards the periphery of the roll at this particular point. The spring blades 15 and 16 permit considerable flexure for their adjustment by means of their bent down front edges.

If in operation the blade is found not to be an accurate engagement of the periphery of the roll at any point along its length, a similar adjustable flexure can be made to bring the same into proper action. Thus by properly manipulating the screws and washers an accurate, perfect adjustment of the blade can be obtained and adjustments can be made at any time for wear.

Fiber or dirt is prevented from entering in between the blades by reason of the sharpened bent down edges of the spring blades and by reason of the rigid clamping which is effected at the rear of the composite blade. The structure can be used for a long time, as adjustments can be made for wear and continued operation. Thus a most advantageous structure has been devised for the purposes stated.

The details and arrangements herein described may be greatly varied by a skilled mechanic without departing from the scope of our invention as expressed in the claims.

Having thus fully described our invention, what we claim and desire to secure by Letters Patent is:—

1. A doctor apparatus comprising a support, a flexible blade carried thereby, and means whereby the flexure of the blade can be changed at different places along its length transversely.

2. A doctor apparatus comprising a support, a flexible blade carried thereby, and means whereby the flexure of the blade can be adjustably changed at different places along its length to cause the same to engage accurately with the roll.

3. A doctor apparatus comprising a support, a composite flexible blade carried thereby, and means whereby the flexure of the composite blade can be changed at different places along its length to cause the same to engage accurately with the roll.

4. A doctor apparatus comprising a support, a composite blade carried thereby comprising a scraper blade and one or more spring blades pressed thereon, and means for adjusting this pressure at different points along the length of the blade.

5. A doctor apparatus comprising a support, a composite blade carried thereby comprising a scraper blade and one or more spring blades pressed therein, the spring blades having bent down front edges, and means for adjusting the pressure of the spring blade or blades at different points along the blade.

6. A doctor apparatus comprising a support, a composite blade carried thereby comprising a scraper blade and one or more spring blades engaging the same, the front edges of the spring blade or blades being bent down and sharpened to fit accurately together.

7. The combination with a resilient flat doctor blade, of a spring held against the base of the blade with a portion spaced therefrom and a portion projecting into contact with the blade along a line parallel to its edge.

8. The combination with a yielding doctor blade, of a spring held at the base of the blade, extending over the surface of the blade spaced therefrom throughout most of the area of the blade and extending toward the blade and engaging it along a line parallel with the edge.

9. The combination with a doctor blade, of a plurality of springs, each spring having a flat base, an inclined edge and a space between located at a higher level, whereby one spring engages the blade and other springs engage adjacent springs, below along a line back of its free edge.

10. The combination with a resilient doctor blade and a rigid support for its back edge, of a spring held at the base of said doctor blade free at its outer edge, said outer edge being sharpened and extending into contact with the doctor blade and having a slanting surface at the edge to prevent the entrance of waste or paper thereunder, and a series of holding devices for said spring, each having a washer longer in one direction than the other, which can be turned with their long dimensions parallel with the edge of the doctor blade or at an angle thereto and fastened in position on the support whereby when held in any angular position they will force the free edge of the doctor blade at that point toward the roll with which it co-operates.

11. The combination with a resilient doctor blade and a rigid support for its back edge, of a spring held at the base of said doctor blade free at its outer edge, said outer edge extending into contact with the doctor blade, and a series of holding washers for said spring, each longer in one direction than the other, which can be turned with their long dimensions parallel with the edge of the doctor blade or any angular position and fastened in position on the support whereby when held in any angular position they will force the free edge of the doctor blade at that point toward the roll with which it cooperates.

12. The combination with a resilient doctor blade and a rigid support for its back edge, of a series of holding devices, each longer in one direction than the other, which can be turned with their long dimensions parallel with the edge of the doctor blade or any angular position and fastened in position on the support whereby when held in any angular position they will force the free edge of the doctor blade at that point toward the roll with which it cooperates.

13. A doctor apparatus comprising a support, a flexible blade carried thereby, and means whereby the flexure of the blade can be changed at different places along its length, said means comprising screws threaded into the support and washers thereon which can be turned to extend more or less outwardly on the blade.

14. A doctor apparatus comprising a support, a groove formed in said support, a blade resting in said groove, and means for holding said blade in position, comprising screws threaded into the support and having washers thereon which can be turned to extend more or less outwardly on the blade.

15. A doctor apparatus comprising a support, a composite blade comprising a scraper blade and one or more spring blades, the spring blade or blades being bent downwardly at the forward edge or edges, and means for holding the blade in position, comprising screws threaded into the support and washers thereon which can be turned to extend more or less outwardly on the blade.

16. A doctor apparatus comprising a grooved support, screws threaded therein, and carrying washers projecting over the groove, and a composite blade having its rear edge fitted in the slot formed by said groove and said washers.

In testimony whereof we have hereunto affixed our signatures.

J. WARREN VEDDER.
FREDERICK W. LODDING.